United States Patent [19]

Haentjens

[11] Patent Number: 5,051,071
[45] Date of Patent: Sep. 24, 1991

[54] HEAT DISSIPATING COUPLING FOR ROTARY SHAFTS

[76] Inventor: Walter D. Haentjens, R.D. #1, Box 566, Sugarloaf, Pa. 18249

[21] Appl. No.: 477,477

[22] Filed: Feb. 9, 1990

[51] Int. Cl.$^5$ ............................................. F04B 39/06
[52] U.S. Cl. ................................ 417/373; 417/423.8; 415/180; 415/124.2; 464/17
[58] Field of Search ............... 417/373, 423.8; 464/17; 74/574; 415/180, 177, 175, 124.2

[56] References Cited

U.S. PATENT DOCUMENTS

| | | | |
|---|---|---|---|
| 2,474,615 | 9/1990 | Busquet | 415/180 |
| 3,066,612 | 12/1962 | Haentjens | 103/111 |
| 3,468,572 | 9/1969 | Haentjens | 278/129 |
| 4,307,627 | 9/1990 | Sullivan | 464/17 |

OTHER PUBLICATIONS

D. G. Shepherd, *Principles of Turbomachinery*, pp. 67 and 68, 1956, The McMillan Company.

*Primary Examiner*—Leonard E. Smith
*Assistant Examiner*—Charles G. Freay
*Attorney, Agent, or Firm*—Hill, Van Santen, Steadman & Simpson

[57] ABSTRACT

A heat-dissipating coupling securing first and second shaft sections together for co-rotation and inhibiting heat transfer between the shaft sections. In an exemplary embodiment, the coupling includes a first coupling half secured to the first shaft section, and a second coupling half secured to the second shaft section. A plurality of air ducts extending generally transversely of the rotational axis of the shafts are formed between the first and second coupling halves. The ducts may be formed by grooves in the first coupling half, which are closed by a planar surface of the second coupling half. The ducts extend generally radially, and may be straight, or curved concavely or convexly with respect to the direction of the rotation of the shaft sections. Air may be supplied to the air ducts by providing one of the shaft sections as a hollow shaft in fluid communication with the coupling. Alternatively, air may be supplied to the ducts via a plurality of air inlet holes formed in the coupling itself.

7 Claims, 2 Drawing Sheets

FIG. 1
FIG. 2
FIG. 3
FIG. 4
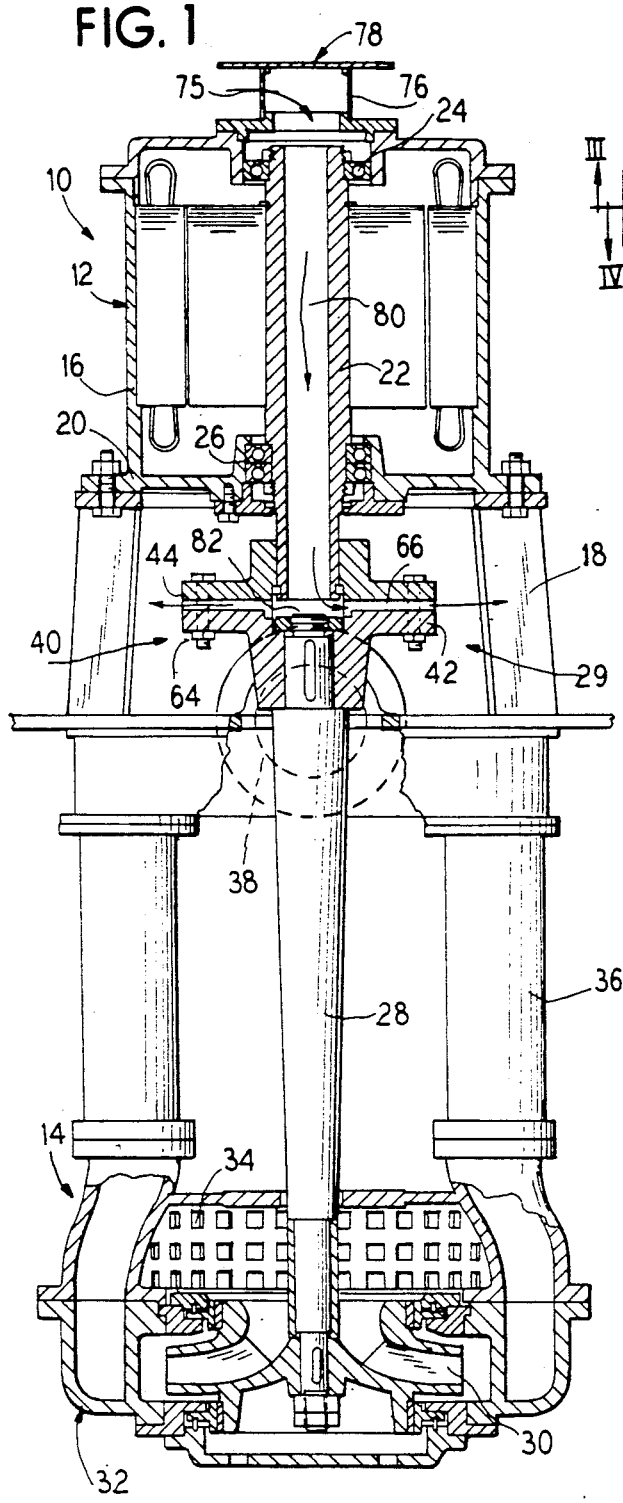
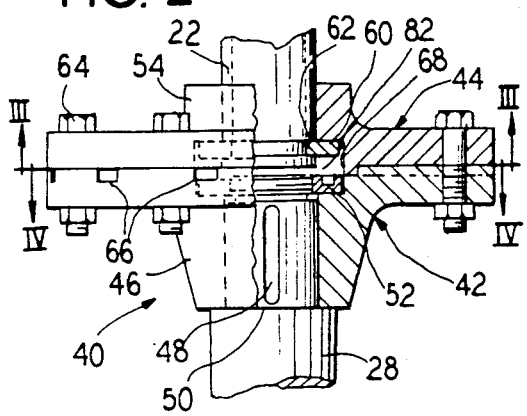
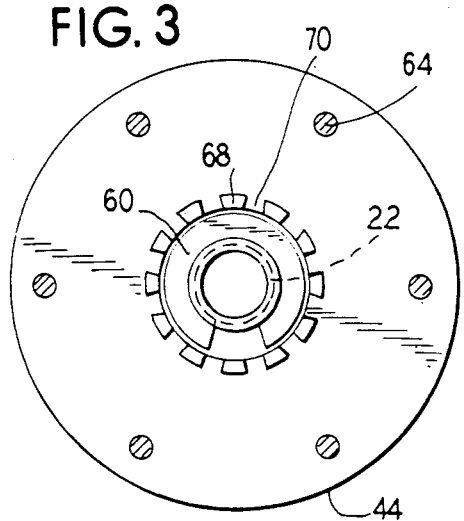
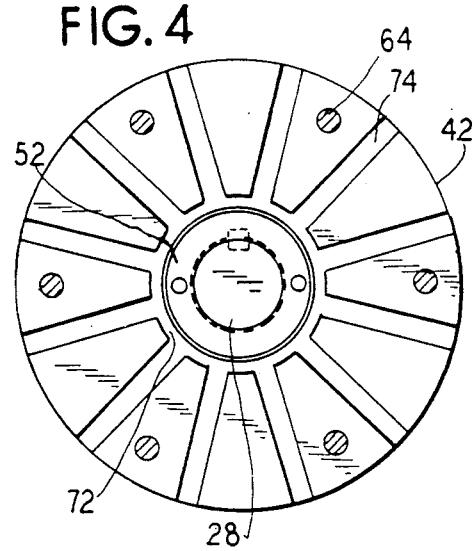

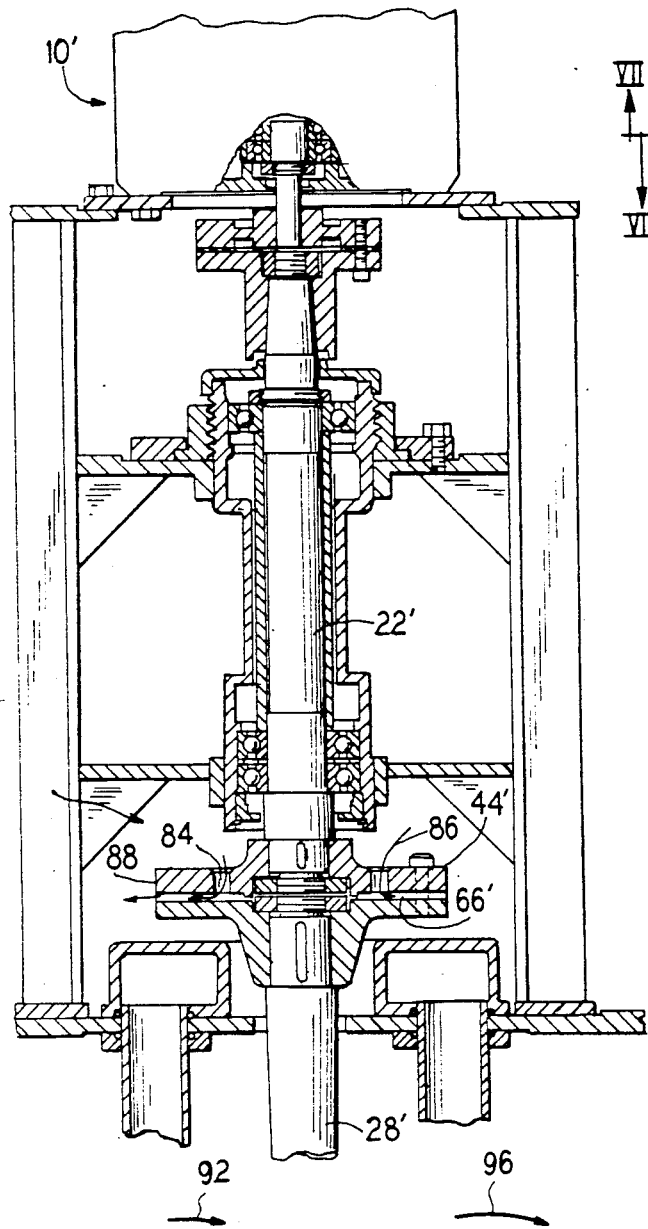
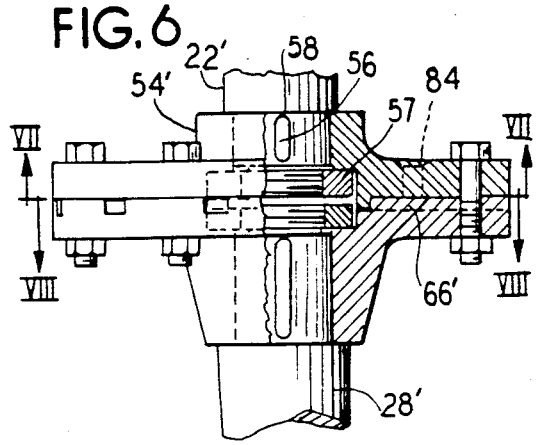
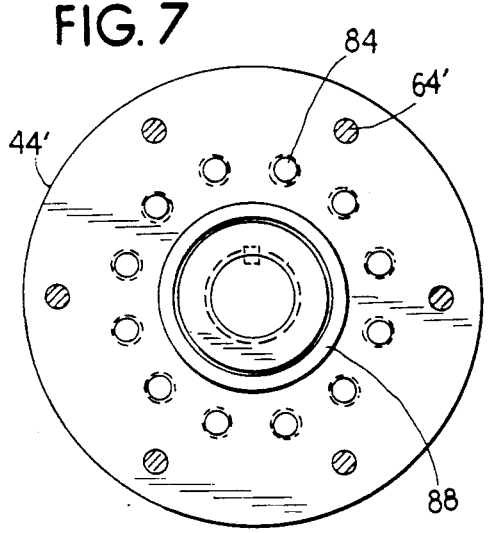
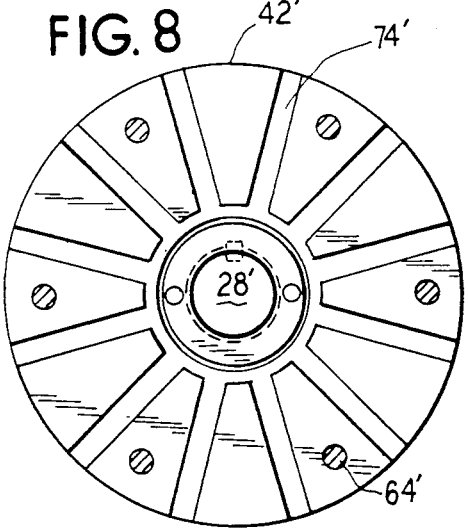

HEAT DISSIPATING COUPLING FOR ROTARY SHAFTS

TECHNICAL FIELD

The invention relates generally to couplings for securing shafts together for co-rotation, and more specifically to a heat dissipating coupling to inhibit heat transfer between such shafts.

BACKGROUND OF THE INVENTION

Various rotary shaft devices are frequently employed in environments where at least part of the device may be exposed to unusually high temperatures. One example of such devices is the vertical cantilevered shaft pump. Such pumps are used in chemical plant operations to pump molten salts, the temperature of which frequently reaches approximately 700° F. Additionally, the pumping heads required of such pumps are frequently quite high; often as high as 200 feet for prilling service.

One such pump is disclosed in U.S. Pat. No. 3,066,612. This pump includes a cantilevered shaft to eliminate submerged bearings, and employs straight impeller rings and casing rings to provide room for length changes of the shaft sections due to temperature variations.

U.S. Pat. No. 3,468,572 discloses a shaft coupling for securing the motor shaft and pump shaft sections for co-rotation. In this device motor bearings form bearing supports both for the motor shaft and for an aligned pump shaft.

In both of the above described devices, the motor and bearings are located out of the high temperature fluid to be pumped. However, the pump shaft reaches the temperature of the pumped material, and heat transferred to the motor shaft from the pump shaft is eventually transmitted to the bearings. Such heat transfer causes thermal expansion of the inner race of bearings and a reduction in the viscosity of bearing lubricant, either of which greatly reduces the life of the bearings.

Although couplings such as described in U.S. Pat. No. 3,468,572 may act as a slight heat sink, operating experience with pumps employing such couplings shows that short bearing life is the greatest maintenance problem, and that heat transmitted to the bearings is a major factor in reducing bearing life. Thus, it is apparent from the foregoing that there exists a need for some means by which heat transfer between the pump shaft and motor shaft of such devices may be inhibited.

SUMMARY OF THE INVENTION

It is, therefore an object of the present invention to provide a coupling that not only secures first and second shaft sections together for co-rotation, but inhibits heat transfer between the shaft sections. This and other objects are achieved by providing a coupling between the first and second shaft sections, wherein the coupling includes at least one air duct passing therethrough.

In an exemplary embodiment, the coupling includes a first coupling half secured to the first shaft section, and a second coupling half secured to the second shaft section. A plurality of air ducts extending generally transversely of the rotational axis of the shafts are formed between the first and second coupling halves. The ducts may be formed by grooves in one of the coupling halfs, which are closed by a planar surface of the other coupling half. The ducts extend generally radially, and may be straight, or curved concavely or convexly with respect to the direction of rotation of the shaft sections.

In one embodiment, one of the shaft sections is formed as a hollow shaft through which air is supplied to the air ducts. The shaft has a first, intake end remote from the coupling, and an second, discharge end affixed to the coupling and in fluid communication with air ducts.

In a second embodiment, both shaft sections are solid, and air is supplied to the air ducts via a plurality of air inlet holes formed in the coupling itself. Each of the inlet holes is formed as an axial passage that corresponds with, and supplies air to, a respective one of the air ducts.

Other objects and advantages of the present invention will become apparent upon reference to the accompanying description when taken in conjunction with the following drawings.

BRIEF DESCRIPTION OF THE DRAWINGS

FIG. 1 is a sectional view, partly broken away, of a vertical cantilevered shaft pump embodying the coupling of the present invention.

FIG. 2 is a detailed sectional view, partly broken away, of the coupling of FIG. 1.

FIG. 3 is a sectional view taken generally along line III—III of FIG. 2.

FIG. 4 is a sectional view taken generally along lines IV—IV of FIG. 2.

FIG. 5 is a sectional view, partly broken away, of a second embodiment of the present invention.

FIG. 6 is a detailed sectional view, partly broken away, of a coupling shown in FIG. 5.

FIG. 7 is a sectional view taken generally along lines VII—VII of FIG. 6.

FIG. 8 is a sectional view taken generally along lines VIII—VIII of FIG. 6.

FIGS. 9 and 10 are sectional views similar to FIGS. 4 and 8, showing alternative air duct configurations.

DESCRIPTION OF THE PREFERRED EMBODIMENTS

FIG. 1 shows a pump assembly 10 including a motor 12 and a pump 14. Although the present invention is illustrated as being employed in a motor-driven pump, it should be noted that this is for exemplary purposes only, and that the present invention is applicable to any rotary shaft device wherein the inhibition of heat transfer between shaft sections is desirable.

The motor 12 includes a motor housing 16 that is supported on a motor stand 18 by means of a lower motor end bell 20.

The motor 12 is adapted to drive a motor shaft section 22 which is supported for rotation in the motor 12 at one end thereof by a radial bearing 24, and at a second end thereof by a set of bearings 26. The motor shaft section 22 is coupled to a pump shaft section 28 for co-rotation therewith the two shaft sections together being termed a shaft assembly 29. The pump shaft section 28 is secured to an impeller 30, which is located in a pump housing 32 of the pump 14. Rotation of the shaft assembly 29 rotates the impeller 30, which causes fluid to be taken in through the in-take 34 and travel through the manifold 32 through pipes 36 to a pump outlet 38, from which it can be collected or conveyed to its final destination (not shown).

A heat-dissipating coupling 40 is shown in detail in FIGS. 2 through 4. The coupling 40 includes a pump coupling half 42 and a motor coupling half 44. The pump coupling half includes a shank portion 46 which coaxially surrounds the pump shaft section 28, and is radially secured thereto with a key 48 inserted into a keyway 50. The pump coupling half 42 is axially secured to the pump shaft section 28 with a coupling nut 52.

Similarly, the motor coupling half 44 includes a shank portion 54 that is shrunk fit to the motor shaft section 22. The motor coupling half 44 is axially secured to the motor shaft section 22 with a split ring 60 disposed in a groove 62 on the motor shaft 22. The coupling halves 42, 44 may be secured to one another using a plurality of bolts 64, or by other known fastening devices.

A plurality of air ducts 66 are formed between the pump coupling halves 42, 44. As can be seen in FIG. 3, the motor coupling half 44 includes a central axial cylindrical flange 68 having a series of radial passages 70 therein. As can be seen in FIG. 4, the pump coupling half 42 includes a cylindrical depression 72, and a series of radially extending grooves 74. When the coupling halves 42, 44 are secured together as with bolts 64, the depression 72 receives the flange 68, and the grooves 74 are aligned with the radial passages 70, with which they correspond in number and location.

Operation of the device can be seen in FIG. 1. Upon actuation, the motor 12 rotates the shaft assembly 29, which actuates the pump 14. Centrifugal force, caused by the rotation of the coupling 40, draws air in the direction of arrows 75 through inlets 76 in an air intake guard 78, through a longitudinal passage 80 formed in the motor shaft section 22, into a chamber 82 between the motor shaft 22 and the pump shaft section 28, and out through the ducts 66. Since the coupling 40 acts as a heat sink, air thus circulated dissipates heat accumulated therein, and therefore inhibits heat transfer between the pump shaft section 28 and the motor shaft section 22.

An alternative embodiment, shown in FIGS. 5-8, discloses a pump assembly 10' having a solid motor shaft section 22'. (In these figures, elements corresponding to those in previously discussed embodiments are indicated with similar reference numerals, distinguished therefrom with "prime" marks.) In this embodiment, air is supplied to air ducts 66' by a series of axial air inlet holes 84, and is circulated in the direction shown by the arrows 86. An axial, cylindrical flange 88 formed on the motor coupling half 44' may be solid, i.e. formed without radial passages 70 as shown in the FIG. 1 embodiment. The motor half coupling 44' includes a shank portion 54' secured to the motor shaft 22' with a key 56 inserted into a keyway 58. The motor coupling half 44' is axially secured to the shaft 22' with a coupling nut 57.

As shown in FIGS. 9 and 10, the configuration of air ducts 66 may be varied depending upon the nature and amount of air circulation desired. In FIG. 9, air ducts 90 are shown which have a curvature that is concave with respect to the direction of rotation as shown by arrow 92. FIG. 10 shows a series of ducts 94, the curvature of which is convex with respect to the direction of rotation as shown by the arrow 96.

Although the present invention has been described with reference to a specific embodiment, those of skill in the art will recognize that changes may be made thereto without departing from the scope and spirit of the invention as set forth in the appended claims.

I claim as my invention:

1. A device of the type including a rotary shaft assembly having first and second shaft sections, said device comprising the following:
   coupling means for securing said first and second shaft sections together for co-rotation;
   air circulation means, associated with said coupling means, for circulating air through said coupling means and inhibiting heat transfer between said first and second shaft sections;
   wherein said first shaft section includes hollow shaft means for supplying air to said air circulation means;
   wherein said hollow shaft means includes an intake end remote from said coupling means, and a discharge end adjacent said coupling means;
   said coupling means includes a first coupling half secured to said first shaft section, and a second coupling half secured to said second shaft section and to said first coupling half;
   said air circulation means comprises a plurality of ducts formed between said first and second coupling halves;
   wherein ducts are formed by grooves in said first coupling half and by a planar surface of said second coupling half;
   wherein said first coupling half includes an annular cylindrical depression at an inlet end of said ducts; and
   said second coupling half includes an axial, cylindrical flange received in said depression, and having a plurality of radial passages therein corresponding in number and location to said ducts.

2. In a centrifugal pump including a vertical axis rotary shaft assembly having a first shaft section extending from a motor, and a second shaft section cantilevered from said first shaft section and connected to drive a centrifugal pump, a heat-dissipated coupling disposed between and rigidly connecting said shaft sections, said heat-dissipating coupling comprising the following:
   a first coupling half secured to said first shaft section;
   a second coupling half secured to said second shaft section and to said first coupling section, whereby said first and second shaft sections are secured together for co-rotation;
   a plurality of air ducts formed between said coupling halves; and
   wherein said first coupling half includes an annular cylindrical depression at an inlet end of said ducts, wherein said second coupling half includes an axial, cylindrical flange received in said depression, and wherein said second coupling half further includes a plurality of radial passages therein corresponding in number and location to said ducts.

3. A heat-dissipating coupling according to claim 2, further wherein said first shaft section comprises a hollow shaft through which air is supplied to said at least one air duct.

4. A heat-dissipating coupling according to claim 3, further wherein said hollow shaft comprises a first, intake end remote from said coupling, and a second, discharge end affixed to said coupling and in fluid communication with said at least one air duct.

5. A heat-dissipating coupling according to claim 4, further wherein said air ducts are formed by grooves in said first coupling half and by a planar surface of said second coupling half.

6. A heat-dissipating coupling according to claim 2, further wherein said air ducts are curved towards a direction of rotation of said shaft sections.

7. A heat-dissipating coupling according to claim 2, further wherein said air ducts are curved away from a direction of rotation of said shaft sections.

* * * * *